(12) United States Patent
Makineni et al.

(10) Patent No.: US 8,036,246 B2
(45) Date of Patent: *Oct. 11, 2011

(54) PACKET COALESCING

(75) Inventors: Srihari Makineni, Portland, OR (US); Ravi Iyer, Portland, OR (US); Dave Minturn, Hillsboro, OR (US); Sujoy Sen, Portland, OR (US); Donald Newell, Portland, OR (US); Li Zhao, Riverside, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/586,964

(22) Filed: Sep. 30, 2009

(65) Prior Publication Data

US 2010/0020819 A1  Jan. 28, 2010

Related U.S. Application Data

(63) Continuation of application No. 10/991,239, filed on Nov. 16, 2004, now Pat. No. 7,620,071.

(51) Int. Cl.
  *H04J 3/24* (2006.01)
(52) U.S. Cl. .......... 370/474; 370/475; 370/476
(58) Field of Classification Search .......... 370/389, 370/392, 394, 474, 476, 335, 469, 471, 473, 370/475; 709/203, 250; 710/41; 714/758
See application file for complete search history.

(56) References Cited

U.S. PATENT DOCUMENTS

| | | |
|---|---|---|
| 3,749,845 A | 7/1973 | Fraser |
| 5,937,169 A | 8/1999 | Connery et al. |
| 6,021,263 A | 2/2000 | Kujoory et al. |
| 6,246,683 B1 | 6/2001 | Connery et al. |
| 6,389,468 B1 | 5/2002 | Muller et al. |
| 6,453,360 B1 | 9/2002 | Muller et al. |
| 6,564,267 B1 * | 5/2003 | Lindsay .................. 709/250 |
| 6,618,793 B2 | 9/2003 | Rozario et al. |
| 6,633,576 B1 | 10/2003 | Melaragni et al. |

(Continued)

FOREIGN PATENT DOCUMENTS

WO  2006/055494 A1  5/2006

OTHER PUBLICATIONS

"Transmission Control Protocol Darpa Internet Program Protocol Specification", prepared for defense Advanced Research Projects Agency, Information Processing Techniques Office, by Information Sciences Institute, University of Southern California, Sep. 1981, 85 pages.

(Continued)

*Primary Examiner* — Hassan Kizou
*Assistant Examiner* — Toan Nguyen (57) ABSTRACT

In general, in one aspect, the disclosures describes a method that includes receiving multiple ingress Internet Protocol packets, each of the multiple ingress Internet Protocol packets having an Internet Protocol header and a Transmission Control Protocol segment having a Transmission Control Protocol header and a Transmission Control Protocol payload, where the multiple packets belonging to a same Transmission Control Protocol/Internet Protocol flow. The method also includes preparing an Internet Protocol packet having a single Internet Protocol header and a single Transmission Control Protocol segment having a single Transmission Control Protocol header and a single payload formed by a combination of the Transmission Control Protocol segment payloads of the multiple Internet Protocol packets. The method further includes generating a signal that causes receive processing of the Internet Protocol packet.

4 Claims, 6 Drawing Sheets

U.S. PATENT DOCUMENTS

| | | | |
|---|---|---|---|
| 6,633,835 B1 | 10/2003 | Moran et al. | |
| 6,665,495 B1 | 12/2003 | Miles et al. | |
| 6,665,755 B2 | 12/2003 | Modelski et al. | |
| 6,708,292 B1 | 3/2004 | Mangasarian | |
| 6,715,005 B1* | 3/2004 | Rodriguez et al. | 710/41 |
| 6,718,326 B2 | 4/2004 | Uga et al. | |
| 6,816,455 B2 | 11/2004 | Goldberg et al. | |
| 6,934,296 B2 | 8/2005 | Shimojo | |
| 6,956,853 B1 | 10/2005 | Connery et al. | |
| 6,957,281 B2 | 10/2005 | Mann et al. | |
| 6,968,358 B2* | 11/2005 | Freimuth et al. | 709/203 |
| 7,012,919 B1 | 3/2006 | So et al. | |
| 7,080,308 B2* | 7/2006 | Schroeder | 714/758 |
| 7,177,956 B2 | 2/2007 | Mann et al. | |
| 7,586,925 B2 | 9/2009 | Smith et al. | |
| 7,936,755 B2 | 5/2011 | Mann et al. | |
| 2001/0048681 A1* | 12/2001 | Bilic et al. | 370/389 |
| 2002/0126711 A1 | 9/2002 | Robinett et al. | |
| 2002/0181506 A1 | 12/2002 | Loguinov | |
| 2003/0007469 A1* | 1/2003 | Daley et al. | 370/335 |
| 2003/0108044 A1 | 6/2003 | Hendel | |
| 2003/0231657 A1 | 12/2003 | Poon et al. | |
| 2004/0013117 A1* | 1/2004 | Hendel et al. | 370/394 |
| 2004/0062245 A1 | 4/2004 | Sharp et al. | |
| 2004/0090988 A1 | 5/2004 | Masputra et al. | |
| 2004/0100952 A1 | 5/2004 | Boucher et al. | |
| 2006/0004933 A1 | 1/2006 | Sen et al. | |
| 2006/0031474 A1 | 2/2006 | Cornett | |
| 2007/0064737 A1 | 3/2007 | Williams | |
| 2009/0154459 A1 | 6/2009 | Husak et al. | |

OTHER PUBLICATIONS

"Internet Protocol Darpa Internet Program Protocol Specification", prepared for defense Advanced Research Projects Agency, Information Processing Techniques Office by Information Sciences Institute, University of Southern California, Sep. 1981, 45 pages.

Hrvoye, Bilic et al., "Deferred Segmentation for Wire-Speed Transmission of Large TCP Frames over Standard Gbe Networks", Techion-Israel Institute of Technology, Department of Electrical Engineering, Aug. 2001, 9 pages.

International Preliminary Report on Patentability for PCT Patent Application No. PCT/US2005/041195, Mailed on May 31, 2007, 7 pages.

WADGE: Achieving Gigabit Performance on Programmable Ethernet Network Interface Cards; May 29, 2001; 9 pages.

Intel: Interrupt Moderation Using Intel Gigabit Ethernet Controllers, Application Note (AP_450); Revision 1.1, Sep. 2003; 16 Pages.

Braden (editor): Networking Group; Internet Engineering Task Force; Request for Comments: 1122; Oct. 1989; 109 Pages.

International Search Report and Written Opinion for Application No. PCT/US2005/041195, Mailed on Mar. 21, 2006, 10 Pages.

Office Action with Search Report Received for Taiwan Application No. 94139145 mailed on Jul. 24, 2008, 12 Pages and English Translation 14 pages.

Zec, Marko; Mikuc, Miljenko; and Žagar, Mario. "Estimating the Impact of interrupt Coalescing Delays on Steady State TCP Throughput." Proceedings of the 10th SoftCOM 2002 Conference. Oct. 2002. 6 Pages.

* cited by examiner

| flow | starting sequence # | bytes coalesced | descriptor address | header address | payload address |
|------|--------------------|-----------------|--------------------|----------------|-----------------|
| | | | | | |
| | | | | | |
| | | | | | |

PACKET COALESCING

This application claims priority to and is a continuation of U.S. patent application Ser. No. 10/991,239, entitled "PACKET COALESCING", filed on Nov. 16 2004 now U.S. Pat. No.7,620,071, which is incorporated by reference in its entirety herein.

BACKGROUND

Networks enable computers and other devices to communicate. For example, networks can carry data representing video, audio, e-mail, and so forth. Typically, data sent across a network is carried by smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately.

A number of network protocols (e.g., "a protocol stack") cooperate to handle the complexity of network communication. For example, a transport protocol known as Transmission Control Protocol (TCP) provides applications with simple mechanisms for establishing a flow and transferring data across a network. Behind the scenes, TCP transparently handles a variety of communication issues such as data retransmission, adapting to network traffic congestion, and so forth.

To provide these services, TCP operates on packets known as segments. Generally, a TCP segment travels across a network within ("encapsulated" by) a larger packet such as an Internet Protocol (IP) datagram. Frequently, for example, in Local Area Networks (LAN), an IP datagram is further encapsulated by an even larger packet such as an Ethernet frame. The payload of a TCP segment carries a portion of a stream of data sent across a network by an application. A receiver can restore the original stream of data by reassembling the received segments. To permit reassembly and acknowledgment (ACK) of received data back to the sender, TCP associates a sequence number with each payload byte.

DETAILED DESCRIPTION

Many applications receive and process significant amounts of network data. Desktop application examples include web-browsers, streaming media players, and network file sharing applications. Server applications include web servers, file servers, storage servers, e-mail servers, and database backends. Typically, the underlying protocol stack (e.g., a TCP/IP stack) receives many packets and individually processes them, even though some or all of these packets are part of the same flow. Associated with the processing of each packet is some processing overhead, for example, due to parsing headers, identifying and updating flow state information, generating an ACK message, and so forth.

Figure 1A:
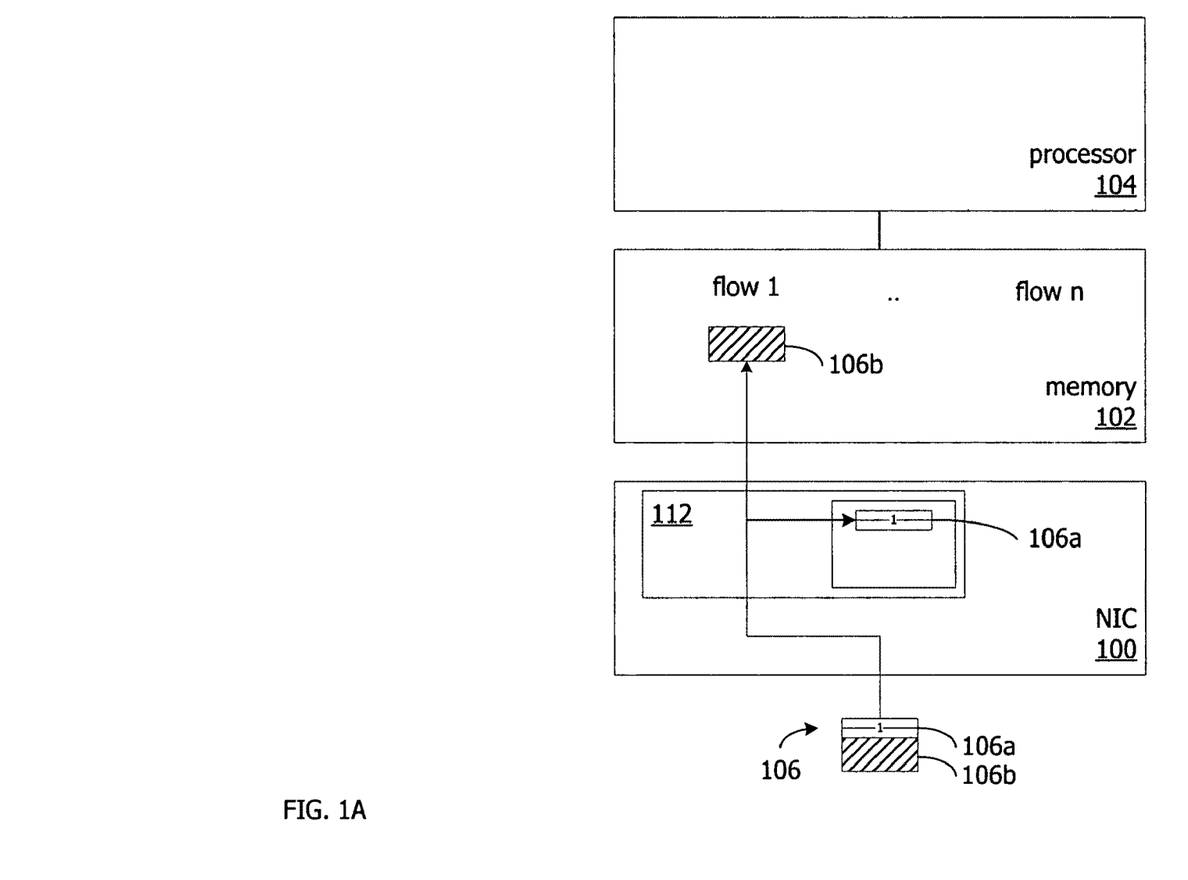
FIGS. 1A-1C illustrate an example of packet coalescing.
Figure 1B:
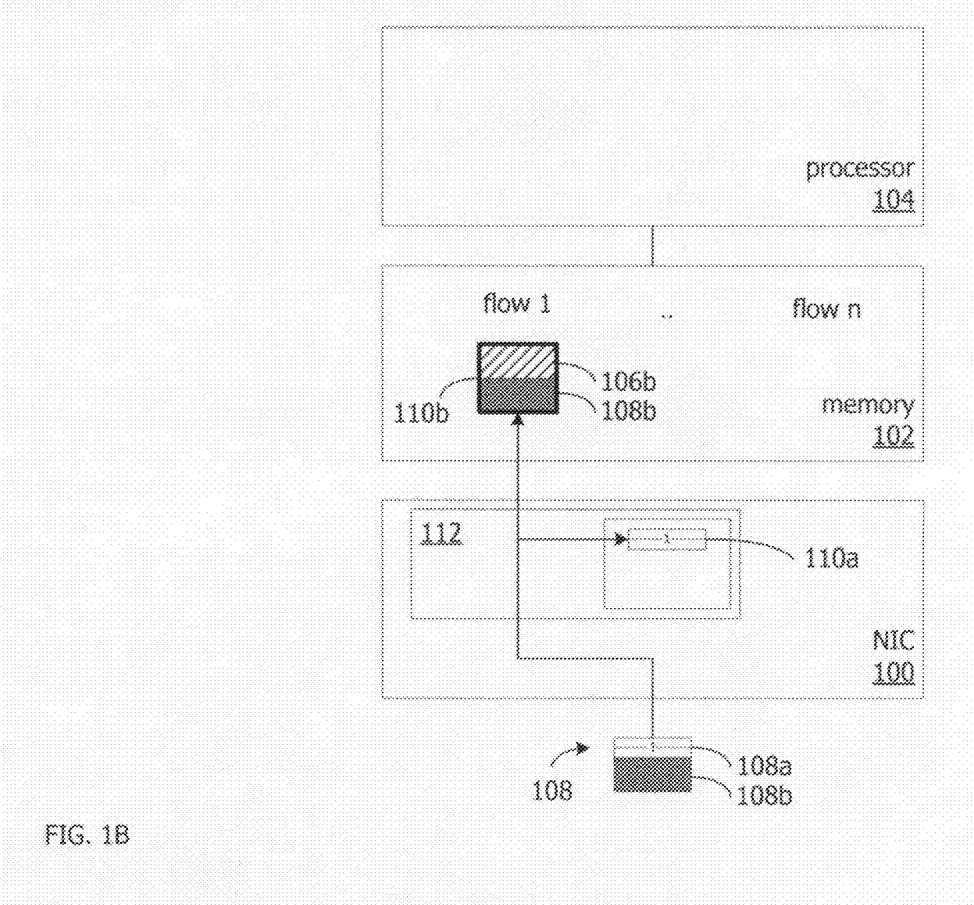
Figure 1C:
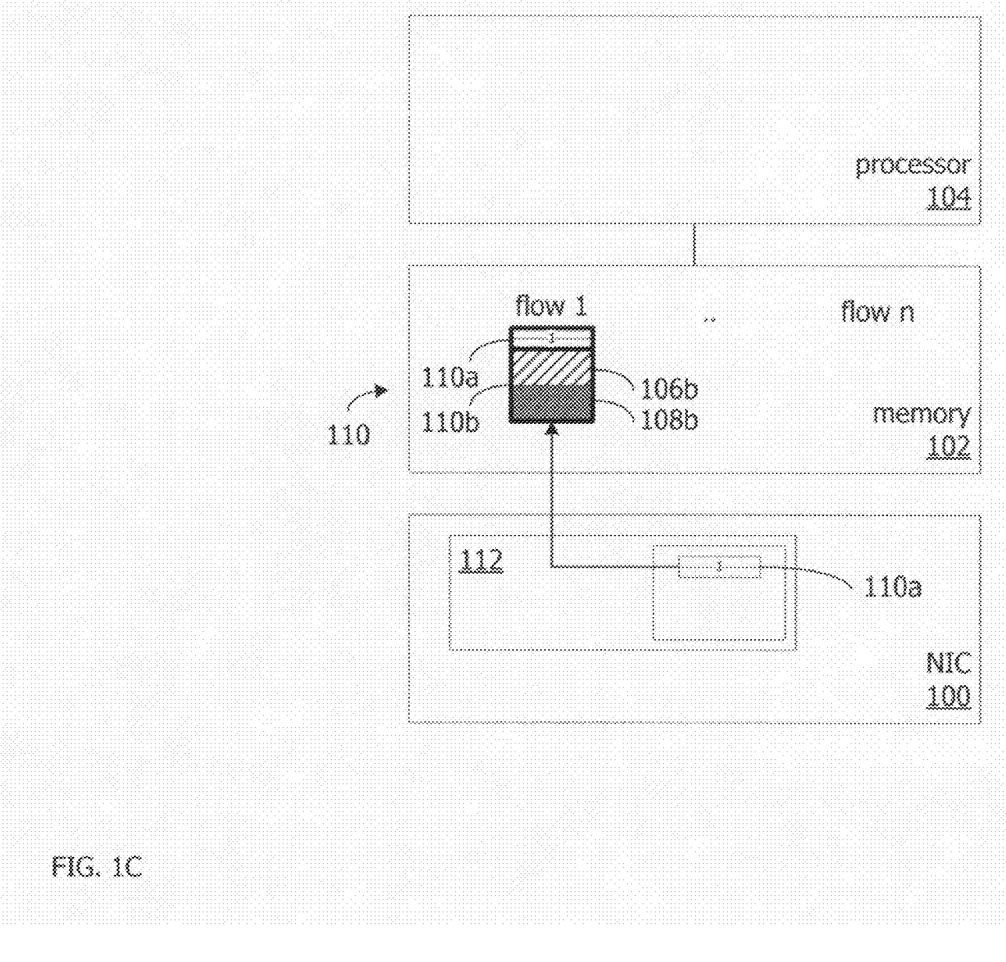

FIGS. 1A-1C illustrate a sample implementation of a technique that coalesces multiple packets for a given flow into a single packet. The sample system shown in FIGS. 1A-1C includes a processor 104 and memory 102. The system also includes a network interface controller (NIC) (a.k.a. network adapter) 100 that receives packets from a network. Instead of writing each received packet into memory 102 for subsequent processing, the controller 100 features logic 112 that coalesces packets. This logic 112 combines the TCP payloads of different packets belonging to the same flow and prepares a single TCP header and a single IP header for the combined TCP payloads. The combination of the IP header, TCP header, and combined TCP payloads forms a single coalesced packet. The protocol stack can, thus, perform receiving processing for fewer but larger packets, reducing the per packet processing penalty incurred.

To illustrate coalescing, FIG. 1A depicts a packet 106 having a TCP and an IP header 106a and a TCP payload 106b received by the network interface controller 100. The controller 100 may perform a variety of tasks including de-encapsulating the packet 106 from within a frame, verifying a frame checksum, and other link layer operations.

As shown, the packet belongs to a flow (arbitrarily labeled "1" in FIG. 1A). A packet's flow can be identified by the controller 100 by data within the header(s). For example, a TCP/IP flow can be identified by a tuple formed by a combination of the IP source and destination addresses and the source and destination port numbers in the TCP header. A tuple may not include all of these header fields and may include other information (e.g., a protocol identifier).

In FIG. 1A, the controller 100 stores the received packet's 106 header 106a and payload 106b for potential coalescing with subsequently received packets. For example, as shown, the controller 100 may store the packet's 106 payload 106b in memory 102, for example, via one or more Direct Memory Access (DMA) operations and store the header 106a in a controller 100 table. The table may also include other information used in the coalescing process. The location in memory 102 to write the payload data 106b may be specified by a descriptor passed to the controller 100 by driver software operating on processor 104. The descriptor may also include other fields such as a memory address of a location to store packet headers, for example, to support header splitting.

In FIG. 1B, the controller 100 receives a second packet 108 that belongs to the same flow ("1") as the packet received in FIG. 1A. Instead of simply writing the packet memory 102, the controller 100 combines the two payloads 106b, 108b of the packets 106, 108 together into a monolithic payload 110b. Combining may involve physically storing the payload bits 106b, 108b contiguously. Alternately, combining may involve associating the payloads 106b, 108b, for example, as nodes in a linked list. This combining of payloads may continue for additional packets received for the flow.

In addition to collecting the different payloads, the controller 100 also prepares a single IP header and a single TCP header 110a for the coalesced packet 110 that reflects the combined TCP payloads 110b. For example, the controller 100 may lookup TCP/IP headers 106a associated with the flow and modify the IP header's length field to reflect the length of the combined payloads. The controller 100 may also revise the TCP header's checksum. Additionally, the controller 100 may alter the TCP header's ACK sequence number to coalesce incoming ACK messages. This updating may be performed as each payload is combined. Alternately, the updating may be postponed, for example, for a period of time.

Eventually (e.g., after a coalescing window ends), as shown in FIG. 1C, the controller 100 may write the headers 110a of the coalesced packet and the flow's descriptor to memory 102. The controller 100 may then signal an interrupt to initiate receive processing (e.g., network and/or transport layer processing) of the coalesced packet 110. For example, TCP receive processing can include reassembly, reordering, generation of ACKs, navigating the TCP state machine for a flow, and so forth.

The number of packets coalesced and/or the period of time to coalesce packets may be configurable. For example, typically, network interface controllers use a technique known as interrupt moderation to batch signaling of packets received in some window of time. The controller 100 can use the interrupt moderation window to coalesce as many packets of a flow as possible. To allow for coalescing overhead (e.g., header preparation), the controller 100 may use a window of time (coalescing window) smaller than the interrupt moderation window to coalesce packets. During the coalescing window, the controller 100 obtains a descriptor for flows that receive data during the coalescing window (e.g., by dequeuing a descriptor provided by a controller 100 device driver) and, generally, retains the descriptor until either the coalescing window expires or the controller 100 receives a flow packet that does not meet coalescing criteria (described below), or the size of the payload exceeds the available space in the packet buffer identified by the descriptor. After the coalesce window expires, the controller 100 prepares headers, writes the descriptors to memory, signals an interrupt at the end of the interrupt moderation time, and clears data used to coalesce packets during the preceding window. The coalescing process then begins anew.

For simplicity of illustration, the system shown in FIGS. 1A-1C does not include many conventional components of a typical platform (e.g., a chipset and/or I/O controller hub interconnecting the processor 104, memory 102, and NIC 100). Additionally, the configuration shown in FIGS. 1A-1C may vary considerably in different systems. For example, a given system may feature multiple processors (e.g., discrete processors and/or processor cores integrated within the same die), multiple NICs, and/or a variety of memory devices (e.g., single, dual, or quad port memory). Similarly, the controller 100 may be integrated within a processor 104, chipset (not shown), or other circuitry. Additionally, the system may include a TCP/IP offload engine (TOE) that can perform tasks described above as being handled by the NIC 100 or processor 104.

Figure 2:
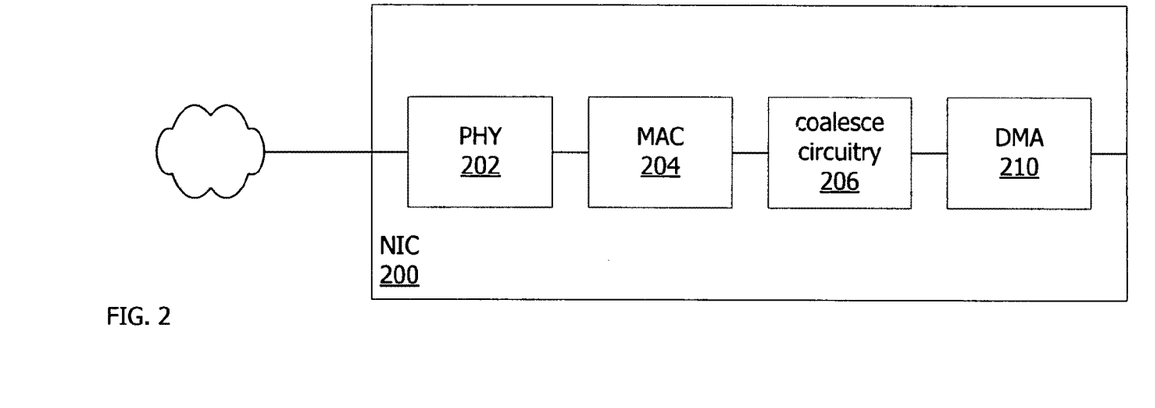
FIG. 2 is a diagram of a network interface controller.

FIG. 2 illustrates a sample architecture of a network interface controller 200 in greater detail. Though shown as processing ingress packets from a network the controller 200 may also process egress packets to the network.

As shown, the controller 100 can include a physical layer device (PHY) 202 that interfaces to a communications medium (e.g., a cable or wireless radio). The PHY 202 can convert between the analog signals of the communications medium and the digital bits used to process a packet. As shown, a media access controller (MAC) 204 collects bits output by the PHY 202 (e.g., via a FIFO queue). The MAC 204 can perform a variety of link-layer operations (e.g., verifying an Ethernet checksum and so forth). Coalesce circuitry 206 operates on packets output by the MAC 204, for example, as illustrated in FIGS. 1A-1C. The coalesce circuitry 206 may be "hard-wired" circuitry such as an Application Specific Integrated Circuitry (ASIC). Alternately, the circuitry 206 may feature a programmable engine that executes instructions to process the packets. As shown, the circuitry 206 interfaces to a host system via DMA controller 210.

Figure 3:
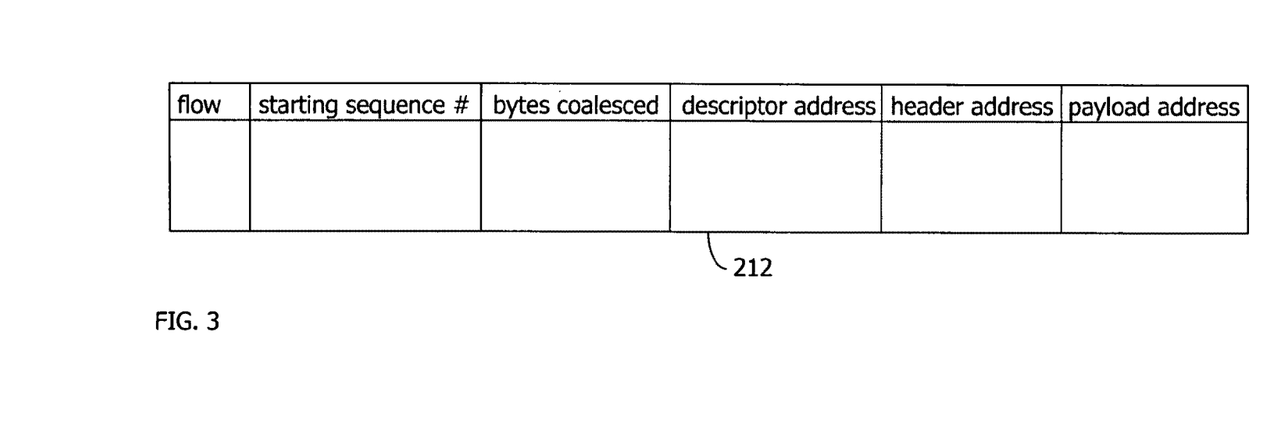
FIG. 3 is a diagram of a table used by a network interface controller to coalesce packets.

The coalesce circuitry 206 may implement coalescing in a variety of ways. For example, as shown in FIG. 3, the circuitry 206 may build a table 212 that tracks on-going coalescing. As illustrated, such a table 212 may associate a flow ID (e.g., a TCP/IP tuple or hash of a TCP/IP tuple) with the starting byte sequence number of a packet, a number of payload bytes, an address of a packet descriptor, an address of a payload buffer, and an address of a header buffer. The table 212 may store other data (not shown) such as header fields for the flow. For example the table 212 may store the IP source, IP destination, IP identification and version, IPv6 flow ID and priority, TCP source port, TCP destination port, TCP sequence number, TCP ACK number, TCP checksum, and/or TCP timestamp(s). The table 212 may also tally the number of packets being coalesced for the flow to later pass that information to the TCP/IP stack (e.g., via a field in the descriptor), the number of ACK segments coalesced, and may store an aging counter to support "descriptor aging" (described below) used to close idle descriptors before the end of a coalesce window.

The table 212 data for a given flow is modified as coalescing progresses. For example, the number of bytes may be adjusted to reflect additional bytes of a newly combined payload. Similarly, the number of payloads coalesced may be incremented with each additional TCP payload combined. The table 212 data can be used to prepare a header for coalesced packets and prepare the corresponding descriptor. Again, the table 212 data may be cleared, for example, after the end of a coalescing window.

The controller may include other components (not shown). For example, the controller may include registers that enable, for example, a driver to enable or disable coalescing.

Figure 4:
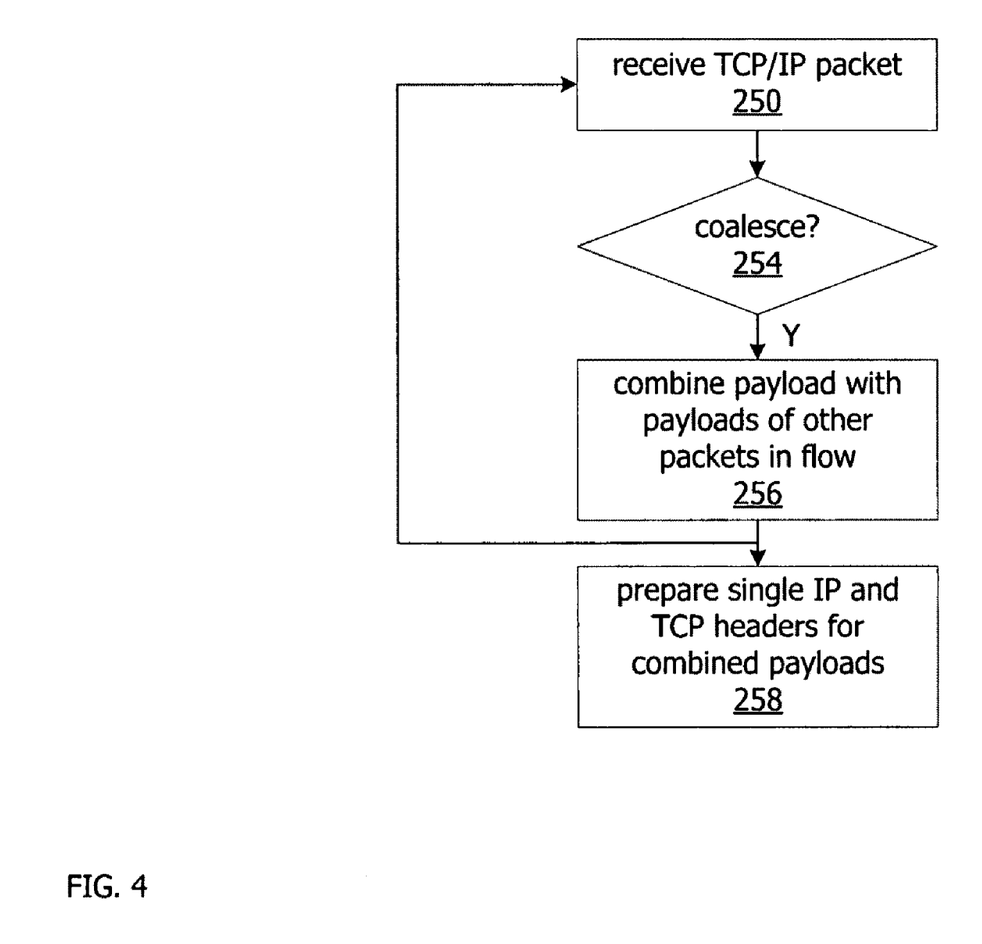
FIGS. 4 and 5 are flow-charts illustrating packet coalescing.

FIG. 4 depicts a flow-chart of a process to coalesce packets. As shown, the process combines 256 the payloads of packets in the same flow and prepares 258 a single TCP segment header and a single IP header for the combined payloads. An interrupt may then be generated to initiate processing of the coalesced packet by a TCP/IP stack.

As shown, some packets may be excluded 254 from coalescing. For example, a packet may need to satisfy one or more criteria. For example, coalescing may only be performed for TCP segments having a valid checksum. Additionally, even a valid TCP segment may be excluded from coalescing with a previously received packet based on header information such as information identifying the segment as a control segment (e.g., a RST, FIN, SYN, SYN-ACK, URG flag set). In these cases, previously on-going coalescing for this flow may terminate (e.g., an IP and TCP header may be prepared and written to memory for any previously combined flow payloads and the corresponding descriptor data written).

Potentially, a TCP/IP packet may be received out-of-order (i.e., the sequence number of a received packet does not match the next sequential sequence number of the flow). In this case, a new coalesce packet may be started (e.g., a descriptor obtained and table entry written). That is, a given flow may have coalescing in-progress at multiple points in the flow's byte sequence. Thereafter, the payload of a flow packet may be added onto one of a variety of packets being coalesced for a given flow based on the received packets sequence number. Alternately, for simplicity, previously on-going packet coalescing for a flow may be terminated after a packet is received out of order.

Other scenarios can affect packet coalescing. For example, if a packet's TCP header indicates the "PUSH" flag is set, coalescing for this flow may complete after coalescing of the received packet and subsequent packets for this flow will be coalesced using a new descriptor. Similarly, if coalescing of an incoming packet's payload exceeds available space in the allocated buffer, the controller can terminate (e.g., generate a single TCP and a single IP header and write the corresponding descriptor) currently on-going coalescing and restart coalescing for the flow anew (e.g., write a new table entry and obtain a new descriptor).

Figure 5:
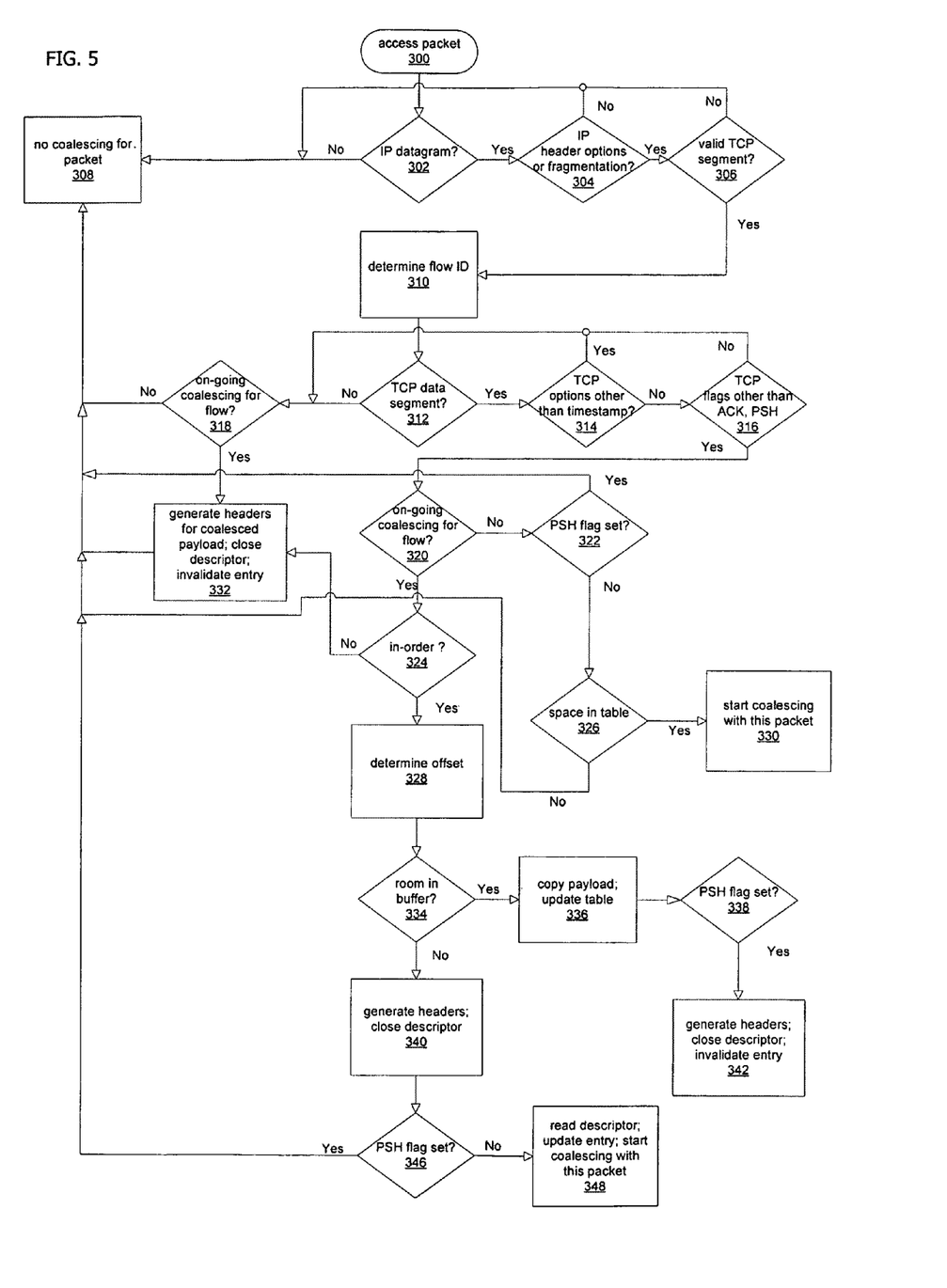

FIG. 5 illustrates a sample implementation of packet coalescing. In the implementation shown, if a packet 300 is an IP datagram 302 (e.g., an IPv4 or IPv6 datagram) or a frame encapsulating an IP datagram, the IP header is examined 304 for header options and/or fragmentation. If either of these conditions exist, coalescing may not occur 308 and the packet may be handled conventionally (e.g., a descriptor obtained, written back, and the packet DMA-ed into memory). Otherwise, the process attempts to validate 306 the TCP segment within the IP packet (e.g., by determining if the TCP segment header checksum is valid). If the TCP segment is not valid, again, no coalescing 308 occurs for the packet. 100281 For valid TCP segments, the process determines 310 a flow ID, for example, based on the packet's TCP/IP tuple. If the TCP segment is a data segment (e.g., IPheader.total_len−Ipheader.header_len−TCPheader.Data_Offset>0) 312, the TCP segment header is examined 314, 316 for options other than the timestamp option and for flags other than ACK and/or PSH. If any 312, 314, 316 of these conditions exist, no coalescing occurs 308. Additionally, if coalescing had already begun for the flow, the existing coalescing is halted 332 by generating the TCP and IP headers, closing the descriptor being used to coalesce packets for the flow, and invalidating the flow's table entry.

Assuming conditions 302, 304, 306, 312,314, 316 are satisfied, the process determines 320 whether coalescing is already being performed for the flow. If not, and the TCP PSH flag is not set, the process can (table space permitting 326) initialize a table entry for the flow, read a descriptor, and start coalescing 330 for the flow with the current packet. If sufficient space does not exist in the table 326 for an additional entry, a previously written entry may be victimized (not shown), for example, using a Least Recently Used algorithm to select an entry to delete and closing the associated descriptor.

If coalescing 320 had already been established for this flow, the process can determine whether the TCP segment was received in-order 324 based on its sequence number. If the segment was received out-of-order 324, on-going coalescing for the flow may be terminated 332. If the segment was retrieved in-order 324 and the payload buffer has sufficient room 334 for the additional TCP payload, the process can combine the payload of the received TCP segment with the payload of previously received TCP segments in the flow by copying 336 the payload data to a determined offset 328 into the payload buffer specified by the flow's descriptor and updating the entry data for the flow (e.g., updating the number of packets coalesced, next expected sequence number, number of payload bytes, and so forth). If the PSH flag for the current segment was set 338, coalescing may be terminated 342 after these operations.

If the buffer to store payloads did not have sufficient room 334 to add the TCP payload of the current packet, the TCP and IP headers may be prepared and the flow descriptor closed 340. In this case, if the PSH flag is set 346, the packet is handled conventionally. Otherwise, a new read descriptor is obtained for the flow and coalescing begins anew 348 with the packet.

After handling the packet, if a coalesce window has expired, packet descriptors and headers are prepared and written to memory and the table contents flushed. Otherwise, the process illustrated in FIG. 5 repeats for another packet.

A wide variety of different variations of the sample process illustrated in FIG. 5 may be implemented. For example, in order to prevent an unfinished descriptor from holding up later descriptors (e.g., if a NIC driver reads descriptors sequentially), the process could close aging descriptors after some fixed amount of time without receipt of additional sequential packets even though the coalesce window may not have expired. Alternately, earlier descriptors may be closed when a later one completes.

While FIGS. 1-5 and corresponding text described sample implementations, a wide variety of other implementations may use one or more of the techniques described above. For example, instead of coalescing the packet in memory, the controller may coalesce packets in its own internal buffers before transferring to memory. Additionally, the techniques may be used to implement other transport layer protocol, protocols in other layers within a network protocol stack, protocols other than TCP and IP, and to handle other protocol data units. For example, instead of Ethernet frames, the packets may be carried by HDLC or PPP frames. Additionally, the term IP encompasses both IPv4 and IPv6 IP implementations.

The term circuitry as used herein includes hardwired circuitry, digital circuitry, analog circuitry, programmable circuitry, and so forth. The programmable circuitry may operate on executable instructions disposed on an article of manufacture (e.g., a non-volatile memory such as a Read Only Memory).

Other embodiments are within the scope of the following claims.

What is claimed is:

1. A method comprising:
   receiving an ingress Internet Protocol packet having an Internet Protocol header and a Transmission Control Protocol segment having a Transmission Control Protocol header and a Transmission Control Protocol payload;
   determining if the received ingress Internet Protocol packet has a flow identifier that matches a flow identifier of a set of Internet Protocol packets having the same flow identifier, the set of Internet Protocol packets to be combined into a single Internet Protocol packet having a single Internet Protocol packet header and a single Transmission Control Protocol header and a single Transmission Control Protocol payload, the flow identifier based, at least in part, on the Internet Protocol source, Internet Protocol destination, Transmission Control Protocol source port, and Transmission Control Protocol destination port of the received ingress Internet Protocol packet, the set of Internet Protocol packets having an associated descriptor;
   after, at least, determinations that the Transmission Control Protocol sequence of the Transmission Control Protocol segment of the received ingress Internet Protocol packet is the next expected Transmission Control Protocol sequence number for the flow and the Transmission Control Protocol header of the received ingress Internet Protocol packet does not have any of a RST, SYN, FIN, or URG flag set:
      adding the received ingress Internet Protocol packet to the set of Internet Protocol packets; and
      incrementing a packet count in the descriptor associated with the set of Internet Protocol packets;
   determining the single Internet Protocol packet combining the set of Internet Protocol packets, the single Internet Protocol packet having a single Internet Protocol header and a single Transmission Control Protocol header and a single Transmission Control Protocol payload formed by a combination of the Transmission Control Protocol payloads of the Transmission Control Protocol payload of the received ingress Internet Protocol packet and Transmission Control payloads of the more than one previously received Internet Protocol packets, the determining the single Internet Protocol packet comprising:

setting an Internet Protocol length field of the single Internet Protocol header to correspond to the combined set of Internet Protocol packets, setting an ACK sequence number of the single Transmission Control Protocol header to correspond to the combined set of Transmission Control Protocol segments; and providing the determined single Internet Protocol packet to a host TCP/IP protocol stack instead of the set of Internet Protocol packets.

2. The method of claim 1,
wherein the determining the single Internet Protocol header further comprises setting the Internet Protocol checksum to correspond to the combined set of Internet Protocol packets.

3. The method of claim 1,
further comprising after, at least, a determination that either the Transmission Control Protocol sequence of the Transmission Control Protocol segment of the received ingress Internet Protocol packet is not the next expected Transmission Control Protocol sequence number for the flow or that the Transmission Control Protocol header of the received ingress Internet Protocol packet has any of a RST, SYN, FIN, or URG flag set:

providing the received ingress Internet Protocol packet to the host TCP/IP protocol stack; and providing the single Internet Protocol packet formed from a combination of the set of Internet Protocol packets.

4. The method of claim 1,
wherein the adding the Internet Protocol packet to the set of Internet Protocol packets having the same flow identifier to be combined into the single Internet Protocol packet comprises adding an entry to a link list where entries in the link list correspond to different packets in the set.

* * * * *